United States Patent
Cuellar et al.

(10) Patent No.: US 7,768,243 B2
(45) Date of Patent: Aug. 3, 2010

(54) AID FOR THE SWITCHING OF A SWITCHED-MODE CONVERTER

(75) Inventors: Francis Cuellar, La Croix en Touraine (FR); Bertrand Rivet, Vouvray (FR)

(73) Assignee: STMicroelectronics S.A., Montrouge (FR)

( * ) Notice: Subject to any disclaimer, the term of this patent is extended or adjusted under 35 U.S.C. 154(b) by 122 days.

(21) Appl. No.: 12/023,333

(22) Filed: Jan. 31, 2008

(65) Prior Publication Data

US 2008/0186748 A1 Aug. 7, 2008

(30) Foreign Application Priority Data

Feb. 2, 2007 (FR) .................................. 07 53026

(51) Int. Cl.
*G05F 1/613* (2006.01)
(52) U.S. Cl. ...................... 323/224; 323/247
(58) Field of Classification Search ................ 323/224, 323/247, 255, 259
See application file for complete search history.

(56) References Cited

U.S. PATENT DOCUMENTS

| 4,977,493 | A | | 12/1990 | Smith | |
|---|---|---|---|---|---|
| 5,307,004 | A | * | 4/1994 | Carsten | ................... 323/222 |
| 5,481,238 | A | * | 1/1996 | Carsten et al. | ............... 336/214 |
| 6,507,174 | B1 | * | 1/2003 | Qian | ........................ 323/222 |
| 2004/0113596 | A1 | | 6/2004 | Peron | |

FOREIGN PATENT DOCUMENTS

| EP | 0 910 158 A1 | 4/1999 |
|---|---|---|
| JP | 60070967 | 4/1985 |

OTHER PUBLICATIONS

French Search Report from corresponding French Application No. FR 07/53026, filed Feb. 2, 2007.

* cited by examiner

*Primary Examiner*—Shawn Riley
(74) *Attorney, Agent, or Firm*—Lisa K. Jorgenson; James H. Morris; Wolf, Greenfield & Sacks, P.C.

(57) ABSTRACT

A switched-mode power converter, including, between a first end of a main inductive element and a switch, a two-value inductive element automatically switching between its two values.

16 Claims, 4 Drawing Sheets

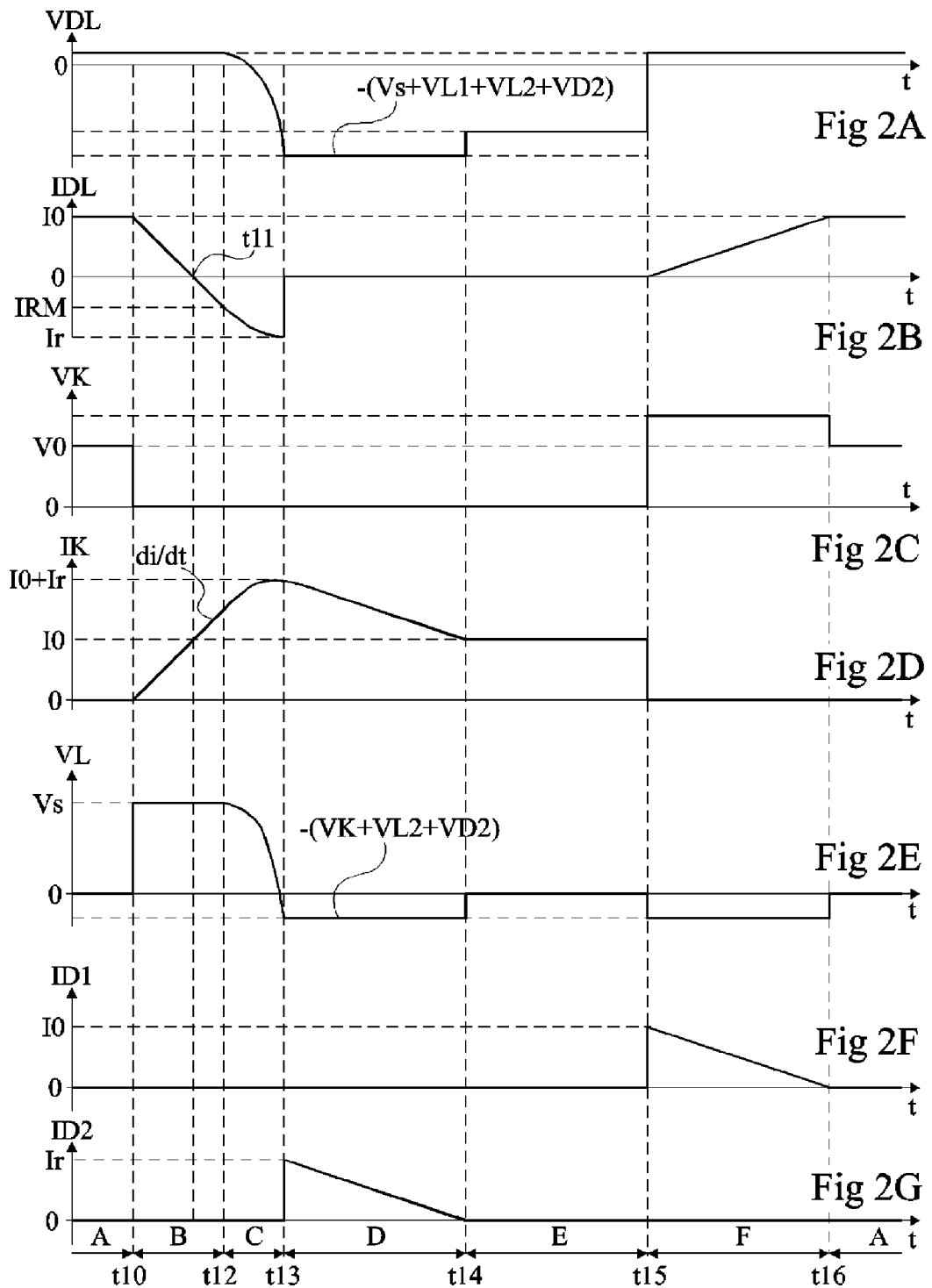

AID FOR THE SWITCHING OF A SWITCHED-MODE CONVERTER

BACKGROUND OF THE INVENTION

1. Field of the Invention

The present invention generally relates to the field of so-called switched-mode power converters. Such converters use an inductive element, associated with a power switch and with a free wheel diode, to perform a power conversion and a correction of the power factor, generally from a D.C. input voltage. Voltage step-down converters (BUCK), voltage step-up converters (BOOST), and composite converters (step-up/step-down) are known.

2. Discussion of the Related Art

Patent application US-A-2004/0113596 describes a switching-aid circuit for a power converter. A magnetic circuit with several windings and with switching diodes is used to organize the discharge of an inductance for controlling the di/dt slope on turning-on of the power switch of the converter and to store the power at the switching to transfer it to the load supplied by the converter.

SUMMARY OF THE INVENTION

The present invention aims at overcoming all or part of the disadvantages of switched-mode converters.

An object more specifically is an improvement of the principle used by a switching aid circuit with a magnetic circuit organizing the discharge of an inductance for controlling the di/dt slope.

An object also is a solution compatible with a use of the converter at frequencies of several hundreds of kHz and for powers on the order of one kW.

To achieve all or part of these objects, as well as others, the present invention provides a switched-mode power converter, comprising, between a first end of a main inductive element and a switch, a two-value inductive element automatically switching between its two values.

According to an embodiment, the two-value inductive element comprises two elements in series having their junction point connected, by a first diode, to a terminal of application of an input voltage.

According to an embodiment, the two-value inductive element comprises two elements in series having their junction point connected, by a first diode, to a terminal for providing an output voltage.

According to an embodiment, the two-value inductive element is an inductance with a midpoint.

According to an embodiment, the main inductive element forms a main winding of a magnetic circuit having two secondary windings electrically in series with their junction point connected to said first end of the main inductive winding.

According to an embodiment, each secondary winding is in series with a diode other than the first diode.

According to an embodiment, the secondary windings take part in a discharge of the two-value inductive element on turning-off and on turning-on of the switch, one of these taking part in the transfer of the power corresponding to the turning-on to said main winding.

The foregoing and other objects, features, and advantages of the present invention will be discussed in detail in the following non-limiting description of specific embodiments in connection with the accompanying drawings.

BRIEF DESCRIPTION OF THE DRAWINGS

FIGS. 2A, 2B, 2C, 2D, 2E, 2F, and 2G illustrate, in the form of timing diagrams, the operation of the converter of FIG. 1;

DETAILED DESCRIPTION

Figure 1:
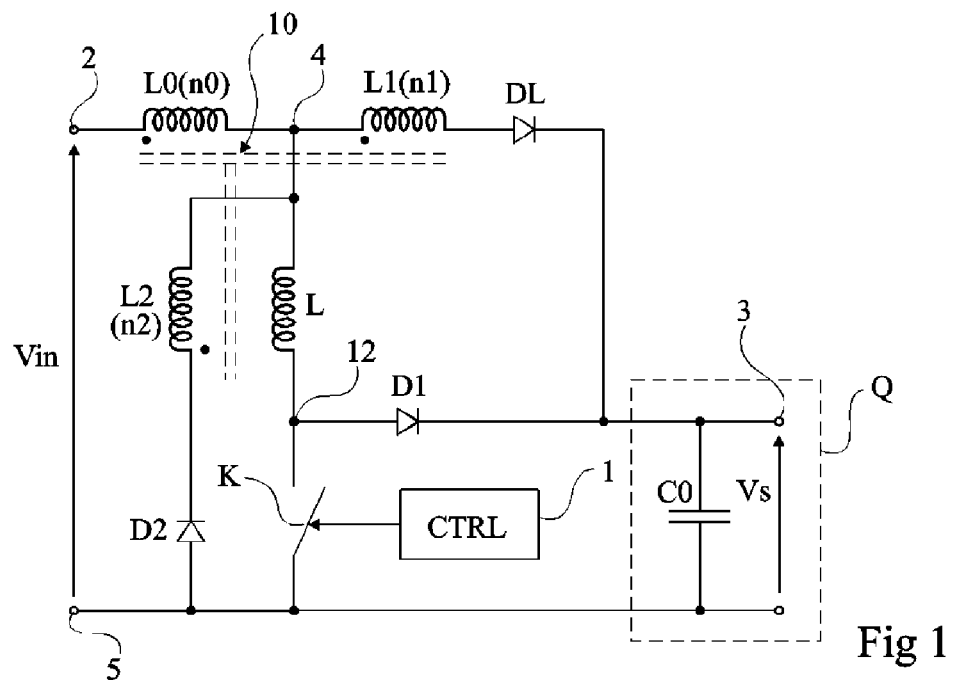
FIG. 1 shows an example of a conventional voltage step-up converter with a switching-aid circuit.

The same elements have been designated with the same reference numerals in the different drawings. For clarity, only those elements which are necessary to the understanding of the present invention have been shown in the drawings and will be described hereafter. In particular, the structure of the power switch control circuit has not been detailed, its forming being within the abilities of those skilled in the art based on the functional indications given in the present description.

FIG. 1 shows the electric diagram of an example of a voltage step-up switched-mode converter, equipped with a usual switching aid circuit.

The power converter comprises a switch K controlled by a circuit 1 (CTRL), for example, a pulse-width modulation control circuit (PWM), a pulse-frequency modulation control circuit (FWM), etc. A power storage inductance L0 is connected, by a first terminal, to a terminal 2 of application of an input voltage Vin (of its most positive potential) provided by a source, not shown (for example, D.C. or rectified A.C.). Switch K is in series with a di/dt control inductance L, connected to second terminal 4 of inductance L0. The other terminal of switch K is connected to a second terminal 5 of application of input voltage Vin (of its most negative potential, generally, a reference voltage, typically, ground). A free wheel diode DL is placed between node 4 and a positive output terminal 3 of the converter. This positive terminal is connected to a first electrode of a storage capacitor C0 (which may be a part of the load Q to be powered) across which output voltage Vs is present. The other terminal of capacitor C0 is connected to ground 5 and the cathode of diode DL is on the side of terminal 3.

Inductance L0 is part of magnetic circuit 10 and forms the main winding thereof. Magnetic circuit 10 comprises two secondary windings L1 and L2 having respective numbers of spirals n1 and n2 smaller than number n0 of spirals of inductance L0. A first winding L1 of magnetic circuit 10 is series-connected with diode DL between terminals 3 and 4. A second winding L2 connects node 4 to terminal 5 in a series-association with a diode D2, the anode of diode D2 being directed towards ground 5. Finally, a diode D1 connects, to terminal 3, node 12 between inductance L and switch K, the anode of diode D1 being connected to node 12.

The function of winding L1 is, on turning off switch K, to impose a negative voltage across inductance L, to enable it to transfer the power that it contains to capacitor C0. Diode D1 is then forward biased.

Winding L2 has the function, on turning-on switch K, of imposing a negative voltage across inductance L, to transfer the power that it contains into winding L2 of magnetic circuit 10. This power is recovered by winding L0 which gives it back to capacitor C0 at the next turning-off of the switch.

To respect such functionalities, the respective phase points of the windings are selected as follows. Assuming that the phase point of winding L0 is connected to terminal 2 as illustrated in FIG. 1, the phase point of winding L1 is on the side of node 4 and the phase point of winding L2 is on the side of ground 5. However, if the phase point of winding L0 is connected to node 4, the phase point of winding L1 is on the side of terminal 3 and the phase point of winding L2 is on the side of node 4. The positions of diodes DL and D2 with respect to windings L1 and L2 with which they are respectively in series may be inverted.

To form a voltage step-down converter, switch K is series-connected with inductance L0 between positive input terminal 2 and output terminal 3 (or between ground 5 and terminal 3), inductance L being interposed. Free wheel diode DL in series with winding L1 connects to ground (respectively, to terminal 2), the junction point of inductances L and L0, the anode of diode DL being connected to ground 5 (respectively its cathode being connected to terminal 2). Inductance L2 in series with diode D2 is connected between terminal 2 and the junction point of inductances L and L0 (respectively between this point and the ground), the anode of diode D2 being on the side of terminal 2 (respectively on the side of terminal 5). Finally, diode D1 connects to ground 5 (respectively to terminal 2) the point between switch K and inductance L, the anode of diode D1 being grounded (respectively, its cathode being connected to terminal 2). With a connection of switch K on the side of terminal 2, if the phase point of winding L0 is on the side of inductance L, the phase point of winding L1 is on the side of ground terminal 5 and the phase point of winding L2 is on the side of terminal 2. With a connection of switch K on the ground side, if the phase point of winding L0 is on the side of terminal 2, the phase point of winding L1 is on the side of terminal 3 and that of winding L2 is on the side of ground 5.

The operating principle is the same. Power is stored in inductance L0 during the on periods of switch K. During periods when switch K is off, this power is given back to capacitor C0, free wheel diode DL being used to loop back the circuit and the magnetic circuit being used to recover losses linked to the turn-on switching of the power switch, to inject them back into the load.

FIGS. 2A to 2G show, in the form of timing diagrams and out of scale, an example of a switching cycle of switch K, illustrating the operation of the switching aid circuit shown in FIG. 1.

FIG. 2A shows voltage VDL across free wheel diode DL. FIG. 2B shows current IDL in diode DL. FIG. 2C shows voltage VK across switch K. FIG. 2D shows current IK in the switch. FIG. 2E shows voltage VL across di/dt control inductance L. FIG. 2F shows current ID1 in diode D1. FIG. 2G shows current ID2 in diode D2. The signs of the currents and voltages shown in FIGS. 2A to 2G are taken in relation with the directions indicated in FIG. 1.

It is assumed that before a time t10, switch K is off, the converter then being in free wheel (phase A). During this free wheel period, a current I0 assumed to be constant flows through diode DL as it is given back by inductances L0 and L1. During phase A when switch K is off, the equivalent diagram of the converter only comprises inductance L0 in series with inductance L1 and diode DL forward biased between terminals 2 and 3, to provide the power to the load and to capacitor C0. Voltage VDL corresponds to the voltage drop in the forward PN junction (on the order of 0.7 V). Switch K sees between its terminals a voltage V0 corresponding to voltage Vs plus voltage VDL and minus the voltage drop in winding L1. Voltage VL in inductance L is indeed zero during this period, as will be seen hereafter in relation with the end of the timing diagrams. Diodes D1 and D2 are blocked and the currents flowing therethrough are accordingly zero. Current IK in off switch K, is of course, zero.

At time t10, circuit 1 controls the turning-on of switch K. An on-state beginning phase B (the first phase of the switching) is then initiated. Considering the equivalent diagram and as compared with phase A, inductance L in series with on switch K (short-circuit) is interposed between node 4 and ground 5. The di/dt slope on turning-on of switch K essentially is a function of inductance L. Indeed, this di/dt slope depends on voltage Vs, on voltage Vin, on the mutual inductance of the magnetic circuit, and on the idle values L11 and L22 of the inductances of the transformer formed by main and secondary windings L0 and L1 and L2. Due to the selected spiral ratio, value L11 is very large as compared with value L22. The mutual inductance is further low as compared with value L11. As a result, the slope (di/dt) is, as a first approximation, equal to Vs/L. Current IDL in diode DL thus decreases along with this slope until a time t12. Since a PN junction is used, the diode exhibits a recovered charge area. Accordingly, current IDL cancels at a time t11, intermediate between times t10 and t12. Time t11 corresponds to the time when the current in switch K reaches value I0. Between times t10 and t12, diodes D1 and D2 remain blocked (non-conducting). Voltage VL across inductance L becomes approximately equal to voltage Vs.

At time t12, the current in diode DL reaches value IRM corresponding to the maximum amount of recovered charges. From time t12, the charges recovered by diode DL decrease. Diode DL then behaves as a capacitance. Since the number of spirals of inductance L1 is small as compared with the number of spirals of inductance L0, voltage VL1 thereacross is low. As a result, the capacitance formed by diode DL negatively discharges. This phenomenon is illustrated in FIG. 2B by a continuation of the decrease of current IDL until a time t13 in the form of a capacitance charge. The current decreases down to a current Ir conditioned by inductance L2. Indeed, voltage VL which decreases during this phase C becomes negative until diode D2 turns on when voltage VL becomes negative enough (time t13). On the side of diode DL, voltage VDL reaches, at time t13, value −(Vs+VL1+VL2+VD2). Voltage VL reaches, at time t13, value −(VK+VL2+VD2).

A time t13 when diode D2 turns on, current IDL in diode DL abruptly stops and the corresponding current is injected back into inductance L2. The excess current (Ir) provides the maximum amplitude of the current in inductance L2. This current depends on the number of spirals n0 and n2 of inductances L0 and L2. From time t13, diode D2 conducts (phase D). Since diode DL is blocked, capacitor C0 is disconnected. The magnetic circuit is, during phase D, dissociated from load Q. Diode D2 is then used as a free wheel element to transfer the power stored by inductance L into the magnetic circuit via winding L2. The voltages across diode DL and inductance L remain unchanged. Similarly, switch K being on, the voltage thereacross is zero. Diode D1 is blocked (non-conducting). When the current is integrally transferred into the magnetic circuit by inductance L2, the current therein cancels (time t14), which causes the natural blocking of diode D2, that is, with a low di/dt slope. Winding L2 enables decrease of the current in switch K by transferring the power to the magnetic circuit which will give it back through inductance L0. Between times t13 and t14, the current in switch K decreases from level I0+Ir down to level I0.

At time t14, the voltage across inductance L cancels, since the power that it used to contain has been transferred into the magnetic circuit. The voltage across diode DL slightly rises while remaining negative and takes a value −(Vs+VL1)+VL+ VK. It should be reminded that voltages VL and VK are then negligible (considered as zero) with respect to voltages Vs and VL1.

From time t14, a phase E is entered where switch K is turned on and where the switching is ended. The equivalent diagram only comprises voltage source Vin, inductances L0 and L, and switch K. Current IK is stable at level I0, and voltage VDL as well, the free wheel diode being blocked. The voltage across switch K, is of course, zero, as well as the voltage across inductance L and the currents in diodes D1 and D2. During phase E, inductance L0 is charged through inductance L and switch K.

At a time t15 when circuit 1 causes the turning-off of switch K, a negative voltage is imposed across inductance L due to the presence of winding L1. In this case, it is not necessary to control the di/dt on turning-off of the transistor. The current is abruptly interrupted in switch K. The inversion of the voltage across inductance L1 causes the evacuation, by diode D1, of the power stored during phase E in inductance L. At time t15, current ID1 thus abruptly takes value I0 and this current decreases to cancel at a time t16. The decrease slope of current ID1 is a function of the value of inductance L and approximately corresponds to VL1/L. The current in inductance L cancels at time t16 and all the current stored in winding L0 then flows through winding L1 and diode DL. It should be noted that diodes DL and D1 conduct at the same time, but the current in diode DL starts from zero at time t15.

At time t16, one has returned to phase A when the switch is off.

The use of a magnetic circuit enables, among other things, recovering losses linked to the turn-on switching of the power switch to inject them back into the load and, to thereby, improve the efficiency.

However, its efficiency in terms of loss reduction is sensitive on the one hand to variations of the value of inductance L and on the other hand to variation of the power demanded by the load.

Figure 3A:
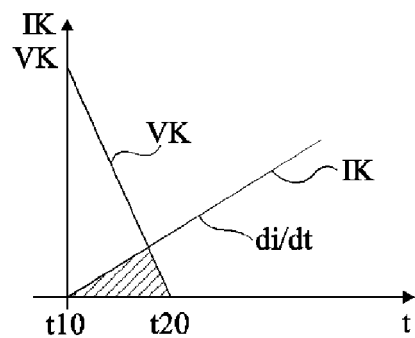
FIGS. 3A and 3B are superposed enlargements of the timing diagrams of FIGS. 2C and 2D for two di/dt control inductances.
Figure 3B:
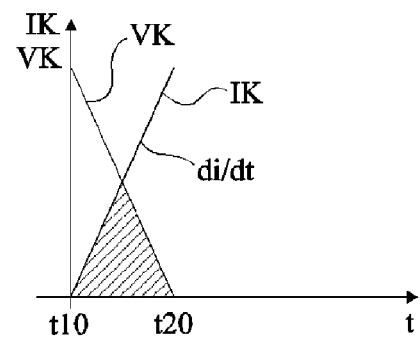

FIGS. 3A and 3B are superposed enlargements of the timing diagrams of FIGS. 2C and 2D at the beginning of phase B (time t10), that is, of a turn-on cycle of switch K, for two different values of inductance L (respectively smaller and greater).

While the decrease slope dVk/dt of voltage VK at the turning-on does not depend on the value of inductance L, settling slope di/dt of current IK depends, among others, on this value (di/dt=Vin/L). As a result, the lower the value of inductance L (FIG. 3B), the higher the current reached through the switch under a non-zero voltage (before time t20). Since the time interval between times t10 and t20 does not depend on the value of L, the lower value L, the higher the power dissipated in switch K on turning-on (hatched surface area in FIGS. 3A and 3B).

Figure 4A:
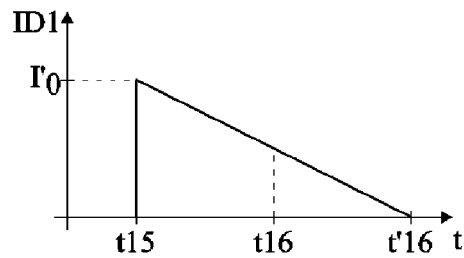
FIGS. 4A and 4B are extracts of FIG. 2F for two output power values called by the load.
Figure 4B:
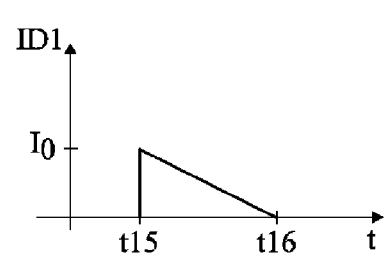

FIGS. 4A and 4B show the timing diagram of FIG. 2F (current ID1 in diode D1) in phase F and around for two different output powers (respectively smaller and greater), illustrating the discharge of inductance L into load Q.

The current disappearing slope depends on the voltage across inductance L, and thus on the voltages across diodes D1 and DL and across inductance L1 (dID1/dt=(−VL1+ (VD1+VDL))/L), but not on the power demanded by the load. Now, this power conditions the value of current I0 crossing switch K during phase E, and thus the power to be released by inductance L during phase F. Accordingly, the time (t16— FIG. 4A, t16'—FIG. 4B) at which current ID1 cancels and from which the next cycle can start occurs later and later as the power increases. The existence of a phase A is however required to preserve the advantages of a smooth switching, which requires that the inductance be discharged before the beginning (time t10) of the next switching cycle. The value of inductance L needs to be decreased (to accelerate its discharge at the end of a cycle) if the power is greater.

The same occurs if the cut-off frequency is high. Indeed, by shortening the general cycle duration (phases F to A), less and less time is available to discharge inductance L and its value should thus be decreased.

Now, decreasing the value of inductance L generates greater losses on turning-on of the switch (FIGS. 3A and 3B). Further, the value dispersions linked to the manufacturing tolerances of the inductive windings of the magnetic circuit may reach some twenty percents.

A compromise between the power dissipated in the switch during turning-on thereof and the power and/or the maximum operation frequency is thus generally performed to select the value of inductance L.

The higher the frequency or the power, the more difficult this compromise. The beneficial effects of the di/dt control on turning-on of the switch by inductance L are then lost.

Figure 5:
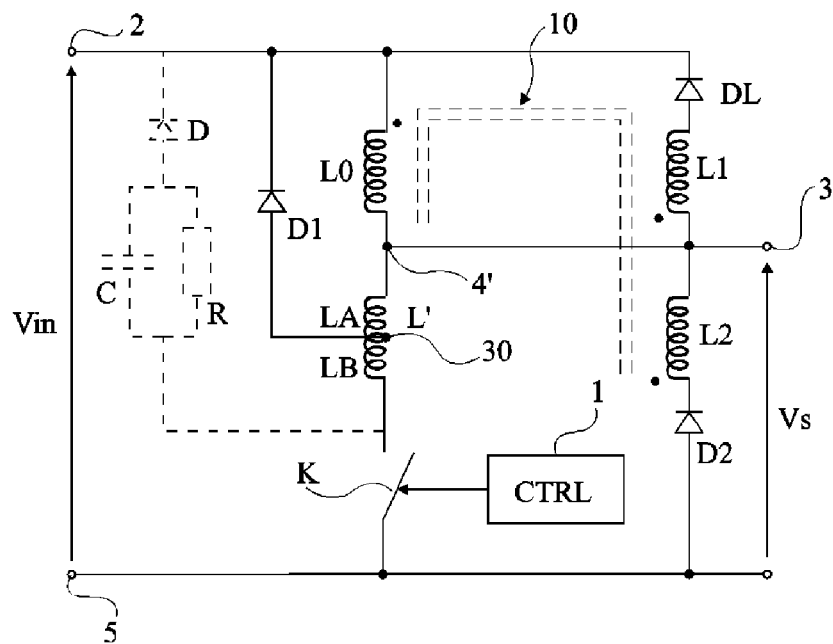
FIG. 5 shows an embodiment of a voltage converter according to the present invention.

FIG. 5 shows an embodiment of a voltage converter according to the present invention. A so-called free wheel assembly performing a power conversion with no voltage buck or boost is assumed.

As compared with the assembly of FIG. 1, inductance L0 directly connects a terminal 2 of application of the highest potential (for example, positive) of a D.C. input voltage Vin and a terminal 3 of provision of a voltage Vs to a load (terminal 4' of inductance L0 connected to terminal 3). Terminal 3 is also connected to a terminal 5 of application of the lowest potential of voltage Vin (for example, ground 5) by an inductive element L' in series with a cut-off switch K. Switch K is controlled by a circuit 1 (CTRL). Inductance L0 is a main winding of a magnetic circuit 10 comprising two secondary windings L1 and L2. A free wheel diode DL in series with a first secondary winding L1 connects terminals 2 and 3, the cathode of diode DL being on the side of terminal 2. A second secondary winding L2 in series with a diode D2 connects terminals 3 and 5, the anode of diode D2 being on the side of terminal 5. The positions of diodes DL and D2 with respect to windings L1 and L2 with which they are respectively in series may be inverted.

According to this embodiment, inductive element L' is an inductance with a midpoint 30, connected by a diode D1 to terminal 2, the anode of diode D1 being on the side of node 30. This inductance with a midpoint forms, with diode D1, a two-value inductive element automatically switching between its two values.

Functionally, this amounts to arranging two inductances LA and LB in series between inductance L0 and switch K and to connecting junction point 30 of inductances LA and LB to terminal 2 by diode D1. The value of inductance LA is selected to be lower than that of inductance LB.

Figure 6A:
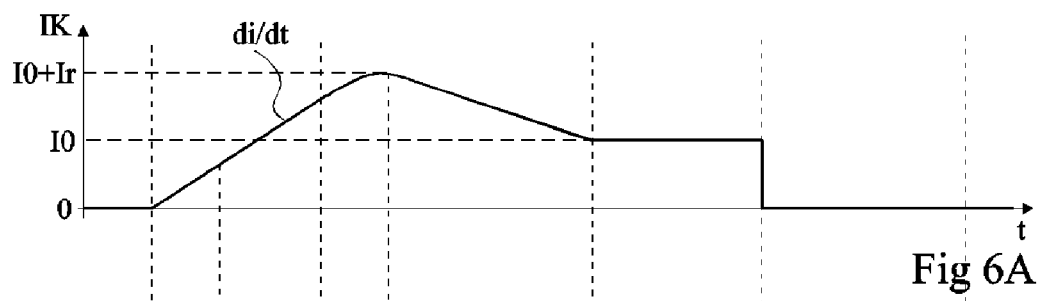
FIGS. 6A, 6B, and 6C illustrate in the form of timing diagrams the operation of the circuit of FIG. 5.
Figure 6B:
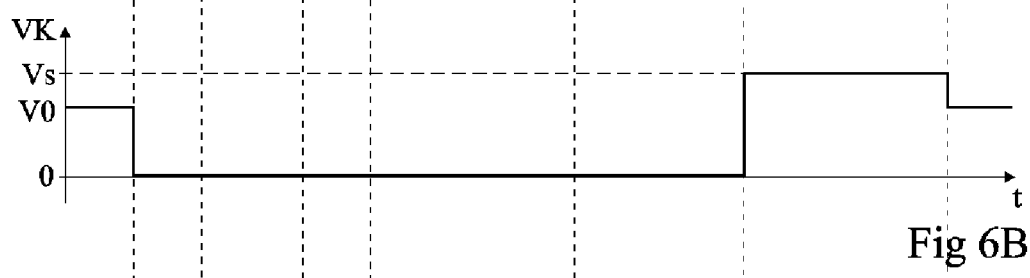
Figure 6C:
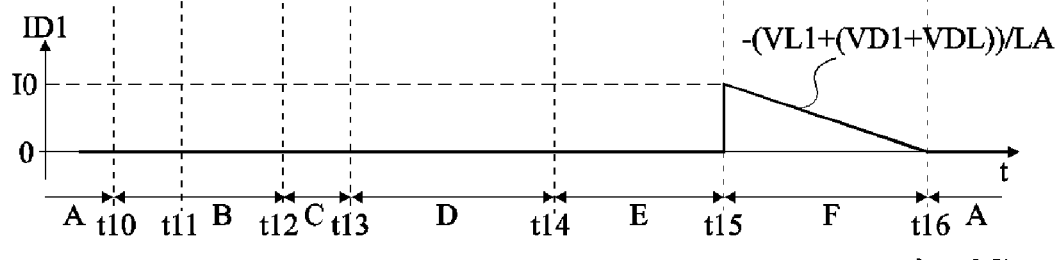

FIGS. 6A, 6B, and 6C are timing diagrams illustrating the operation of the converter of FIG. 5. FIG. 6A is an example of the shape of current IK in switch K during a cut-off cycle of input voltage Vin. FIGS. 6B and 6C show the corresponding shapes of voltage VK across switch K and of current ID1 in diode D1. Such shapes, like those of the rest of the circuit, correspond to those of FIGS. 2A to 2G, but with a slope di/dt of growth of current IK in phase B and with a discharge (dIL'/dt) of inductive element L' set by different inductance values (LA and LA+LB).

Between times t10 and t12, the equivalent diagram of the assembly amounts to applying voltage Vin across the series association of inductance L0 with inductance L' (LA+LB), diodes DL, D1, and D2 being blocked. The current conducted by L0 is shared between the load (capacitor C0, FIG. 1) and inductance L'.

Between times t15 and t16 (phase F), the discharge of di/dt control inductance L' is only performed for a portion thereof (inductance LA). The slope of this discharge then depends on the value of inductance LA while the charge slope depends on the total value LA+LB. This enables selecting the value of inductance LA according to the duration desired or available for phase F and preserving the existence of a dead time (phase A) which is compatible with manufacturing tolerances, while preserving a sufficient inductance (LA+LB) for a smooth switching on turning-on of the switch.

Figure 7:
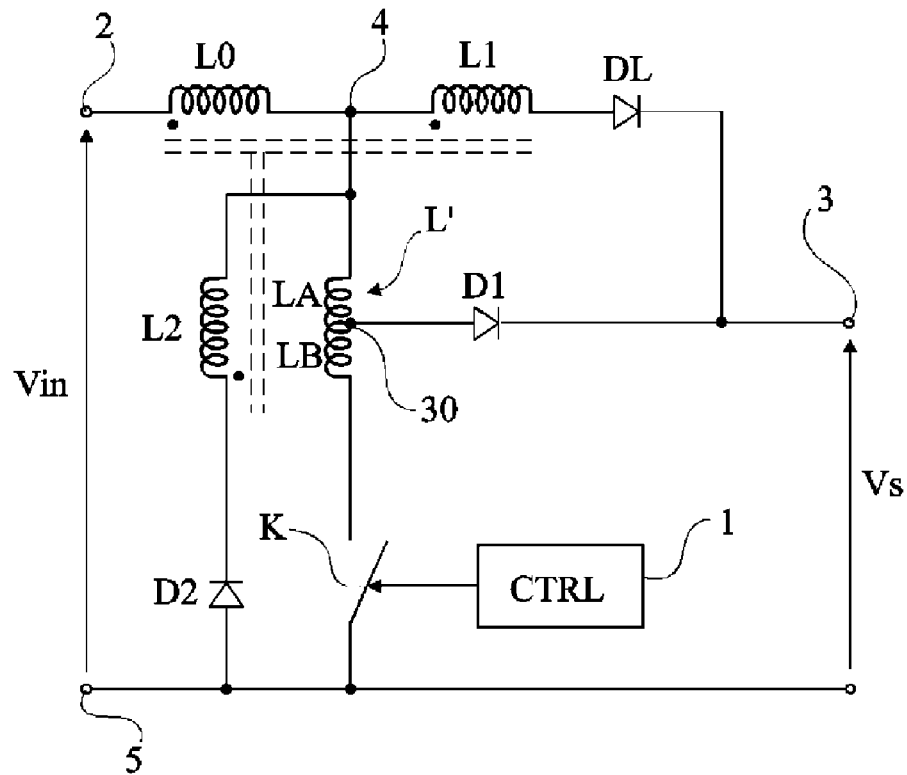
FIG. 7 shows an embodiment of a voltage step-up circuit according to the present invention.

FIG. 7 shows an embodiment of a step-up converter. As compared with the assembly of FIG. 1, inductance L is replaced with an inductance L' with a midpoint 30 and the anode of diode D1 is connected to this midpoint. The operation of the circuit of FIG. 7 can be deduced from that discussed in relation with the previous assemblies.

Figure 8:
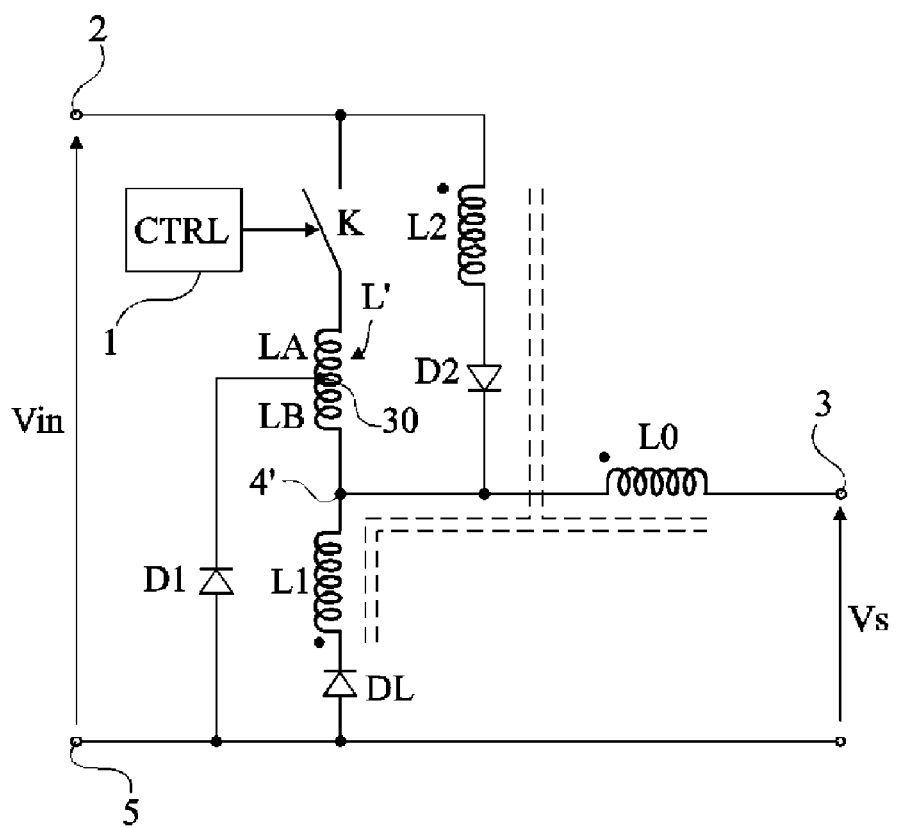
FIG. 8 shows an embodiment of a voltage step-down circuit according to the present invention.

FIG. 8 shows an embodiment of a step-down converter. As compared with the assembly of FIG. 7, switch K connects terminal 2 with a first end of inductance L' (on the side of portion LA) and inductance L0 is between terminal 3 and the other end (terminal 4') of inductance L'. The series association of diode DL and of inductance L1 is between terminal 4' and ground 5, the anode of diode DL being on the side of terminal 5. The series association of inductance L2 and of diode D2 connects terminals 2 and 4', the anode of diode D2 being on the side of terminal 2. Finally, diode D1 connects midpoint 30 of inductance L' to ground 5, the anode of diode D1 being on the ground side. The operation of the circuit of FIG. 8 can be deduced from that discussed in relation with the previous assemblies.

An advantage of the circuits of FIGS. 5, 7, and 8 is that they combine a smooth switching decreasing the losses on turning-on of the switch with a recovery of part of these losses to inject them back into the load when the switch is off.

Another advantage is that the operation is automatic in the value switching of the concerned inductance between the turning-on and the turning-off of the switch.

The circuit operation is compatible with high cut-off frequencies (more than some hundred kHz) and with powers greater than 0.5 kW.

Further, no additional control with respect to the current control of cut-off switch K is necessary. Further, control circuit 1, provided that it performs a regulation of output voltage Vs (which is generally the case), does not have to be modified to adapt the duty cycle.

Magnetic circuit L0, L1, L2 may be made in the form of a single inductance with three windings.

Inductive element L' is, preferably, an inductance with a midpoint formed by a conductive winding on a same core. This has the advantage of avoiding possible electromagnetic compatibility problems. As a variation, inductance L' may be formed of two separate windings in series.

The element for automatically switching the inductance value between turn-on (LA+LB) and turn-off (LB) phases preferably is a diode (D1), due to its simplicity.

To avoid possible overvoltages across switch K, a limiter shown in dotted lines in FIG. 5 (capacitor C in parallel with a resistor R, all in series with a diode D) may optionally be provided between switch K and terminal 2 (with the cathode of diode D on the side of terminal 2) in parallel on diode D1. A similar assembly may be provided, between switch K and terminal 3 (with the cathode of diode D on the side of terminal 3) for a step-up converter (FIG. 7) or in parallel with switch K (with the cathode of diode D on the side of terminal 2) for a step-down converter (FIG. 8).

Of course, the present invention is likely to have various alterations, modifications, and improvements which will readily occur to those skilled in the art. In particular, the sizing of the different windings of the magnetic circuit may be modified provided to respect a winding L0 of a number n0 of spirals much greater (for example, by a ratio on the order of 10) than numbers n1 and n2 of spirals of windings L1 and L2. Preferably, the numbers of spirals of windings L1 and L2 are equal. For inductance L', this choice depends for value LA, among others, on the maximum cut-off frequency and on the maximum power demanded by the load, and on the acceptable losses for value LB. For example, values LA and LB are by a ratio (LB/LA) ranging between 0.1 and 0.7.

Further, the present invention applies to any converter assembly (free wheel, step-down, step-up or composite), provided that it is a switched-mode converter. In particular, the various variations for a converter assembly (switch K on the side of the most positive terminal 2 or of the most negative terminal 5, respective positions of the diodes in their series associations with the inductances, etc.) are transposable to the present invention.

Finally, among the possible variations, inductance L0 may be divided into a (main) element of the magnetic circuit in series with a separate inductance, which does not belong to the magnetic circuit. The diode switching speed may also be adapted although, to obtain the advantages of the present invention, the diodes need not be fast.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A switched-mode power converter, comprising, between a first end of a main inductive element and a switch, a two-value inductive element automatically switching between a first value and a second value, wherein the first value is greater than the second value, wherein the two-value inductive element has the first value upon turning on the switch and has the second value upon turning off the switch, wherein the two-value inductive element comprises a first element and a second element in series, wherein a junction point of the first element and the second element is connected to a first diode.

2. The converter of claim 1, wherein the first diode is connected to a terminal of application of an input voltage.

3. The converter of claim 1, wherein the first diode is connected to a terminal for providing an output voltage.

4. The converter of claim 1, wherein the two-value inductive element is an inductance with a midpoint.

5. The converter of claim 1, wherein the main inductive element forms a main winding of a magnetic circuit having two secondary windings electrically in series with their junction point connected to said first end of the main inductive winding.

6. The converter of claim 5, wherein each secondary winding is in series with a diode other than the first diode.

7. The converter of claim 5, wherein the secondary windings take part in a discharge of the two-value inductive element on turning-off and on turning-on of the switch, one of these taking part in the transfer of the power corresponding to the turning-on to said main winding.

8. A switched-mode power converter, comprising:
  a switch; and
  an inductor that limits a rise of current through the switch using a first inductance value and allows current to flow through the inductor using a second inductance value when the switch is turned off;
  wherein the first inductance value is greater than the second inductance value.

9. The switched-mode power converter of claim 8, wherein the inductor comprises first and second inductive elements in series.

10. The switched-mode power converter of claim 9, wherein a junction point between the first and second inductive elements is coupled to a diode, wherein the diode is coupled to an input of the switched-mode power converter.

11. The switched-mode power converter of claim 8, further comprising a magnetic circuit that recovers energy discharged by turning on the switch.

12. A switched-mode power converter, comprising:
  a switch;
  an inductor that limits a rise of current through the switch using a first inductance value and allows current to flow through the inductor using a second inductance value when the switch is turned off, wherein the first inductance value is greater than the second inductance value; and
  a magnetic circuit that recovers energy discharged by turning on the switch,
  wherein the magnetic circuit comprises a primary winding, a first secondary winding and a second secondary winding, wherein the first secondary winding is in series with a first diode and the second secondary winding is in series with a second diode.

13. The switched-mode power converter of claim 12, wherein the second diode is coupled to an output of the switched-mode power converter.

14. The switched-mode power converter of claim 12, wherein the primary winding is coupled to an output of the switched-mode power converter.

15. The switched-mode power converter of claim 12, wherein the inductor comprises first and second inductive elements in series.

16. The switched-mode power converter of claim 15, wherein a junction point between the first and second inductive elements is coupled to a diode, wherein the diode is coupled to an input or output of the switched-mode power converter.

* * * * *